United States Patent
Malesevich

(10) Patent No.: US 10,781,782 B1
(45) Date of Patent: *Sep. 22, 2020

(54) ENGINE PRE-OVERHEAT SENSORS AND WARNING SYSTEM

(71) Applicant: James N. Malesevich, Mayville, WI (US)

(72) Inventor: James N. Malesevich, Mayville, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/180,136

(22) Filed: Nov. 5, 2018

Related U.S. Application Data

(63) Continuation-in-part of application No. 15/668,176, filed on Aug. 3, 2017, now Pat. No. 10,119,511, which is a continuation of application No. 14/955,818, filed on Dec. 1, 2015, now Pat. No. 9,726,133.

(60) Provisional application No. 62/086,887, filed on Dec. 3, 2014.

(51) Int. Cl.
  *F02N 11/08* (2006.01)
  *F01P 11/16* (2006.01)
  *F02D 41/22* (2006.01)

(52) U.S. Cl.
  CPC .......... *F02N 11/0803* (2013.01); *F01P 11/16* (2013.01); *F01P 2031/20* (2013.01); *F02D 41/221* (2013.01); *F02D 2041/228* (2013.01); *F02D 2200/021* (2013.01)

(58) Field of Classification Search
  CPC ....... F02N 11/08; F02N 11/0803; F01P 11/16; F01P 2031/20; F02D 41/221; F02D 2041/228; F02D 2200/021
  See application file for complete search history.

(56) References Cited

U.S. PATENT DOCUMENTS

| | | | |
|---|---|---|---|
| 3,626,346 A | 12/1971 | Brock |
| 4,401,848 A | 8/1983 | Tsunoda |
| 4,755,790 A | 7/1988 | Umehara |
| 6,169,953 B1 | 1/2001 | Panoushek |

(Continued)

FOREIGN PATENT DOCUMENTS

| JP | 08319864 A | 12/1966 |
|---|---|---|
| JP | 2008228510 A | 9/2008 |

*Primary Examiner* — Hieu T Vo
(74) *Attorney, Agent, or Firm* — Craig A. Fieschko, Esq.; DeWitt LLP

(57) ABSTRACT

A pre-overheat system for minimizing engine damage due to overheating includes a temperature sensor and a warning system that alerts the vehicle's operator (using light, sound, vibration, etc.) if temperatures exceed steady-state temperatures and/or reach higher pre-overheat temperatures. Steady-state temperatures are measurable when the vehicle is functioning normally (especially its cooling system) and is running in normal environmental conditions, but is lower than a redzone overheat temperature for the particular vehicle. When the redzone overheat temperature is reached, the vehicle has gotten too hot and is likely to sustain irreparable damage. The operator can reduce or prevent damage to the vehicle by taking corrective action (such as stopping and checking coolant level and clearing debris from clogged vents and screens) before the vehicle is overheated. A shutdown mechanism can shut off the vehicle before the redzone overheat temperatures are reached.

20 Claims, 2 Drawing Sheets

(56) References Cited

U.S. PATENT DOCUMENTS 9,492,774 B2 * 11/2016 Brown ............... B01D 46/0086
9,726,133 B1    8/2017 Malesevich
10,119,511 B1 * 11/2018 Malesevich ............. F01P 11/16

* cited by examiner

FIGURE 1 (PRIOR ART)
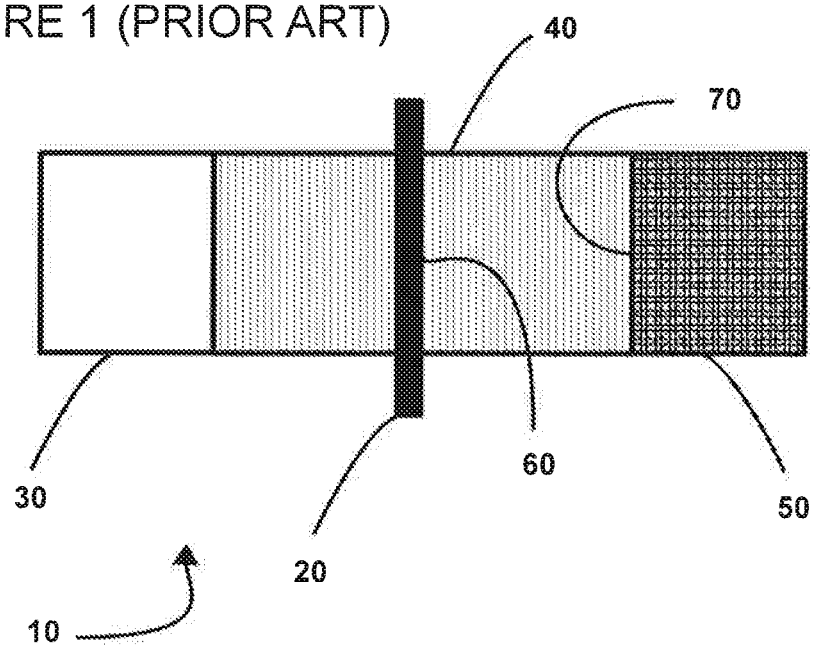
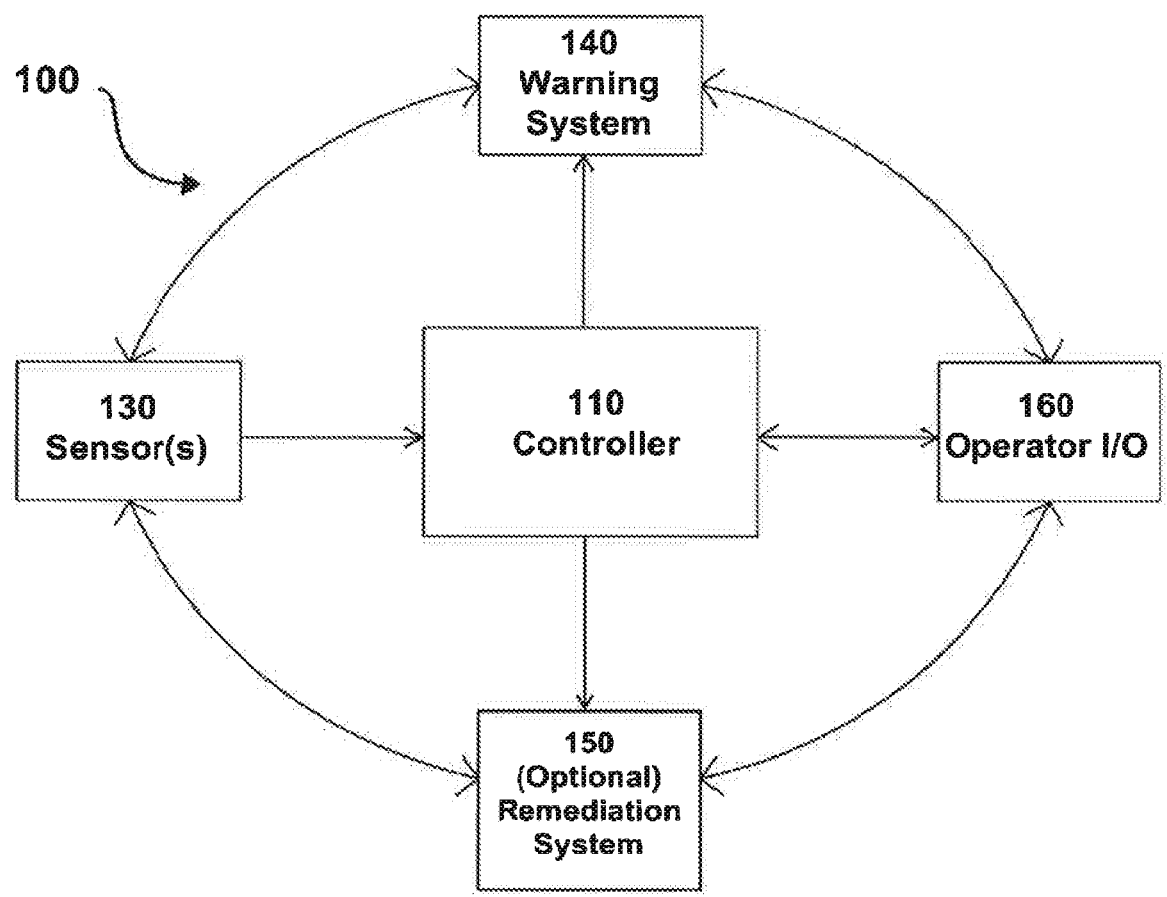
FIGURE 2

ENGINE PRE-OVERHEAT SENSORS AND WARNING SYSTEM

CROSS-REFERENCE TO RELATED APPLICATIONS

This application is a continuation-in-part of U.S. patent application Ser. No. 15/668,176 filed Aug. 3, 2017 (now U.S. Pat. No. 10,119,511), which is a continuation of U.S. patent application Ser. No. 14/955,818 filed Dec. 1, 2015 (now U.S. Pat. No. 9,726,133), which in turn claims priority under 35 USC § 119(e) to U.S. Provisional Patent Application 62/086,887 filed Dec. 3, 2014. The entireties of these prior applications are incorporated by reference herein.

FIELD OF THE INVENTION

This document concerns an invention relating generally to avoiding damage to vehicles arising from overheating, and more specifically to pre-overheat systems that warn drivers that temperatures are rising and that overheating is imminent in time to take corrective action to reduce or prevent permanent damage.

BACKGROUND OF THE INVENTION

Heavy-duty vehicles that are commonly used in high-debris environments, such as trucks, tractors, combines, and off-road vehicles, are highly prone to overheating. This is in large part because debris (such as grass, dust, rocks, and snow) can build up and clog the engine's ventilation system, cause coolant leaks, or otherwise result in a dysfunction in engine temperature control. Such vehicles usually have simple temperature gauges (see FIG. 1) to indicate when the engine has reached the "red zone" temperature—i.e., a temperature that is substantially higher than the normal operating temperature (e.g., 50 or more degrees above normal). The conventional temperature gauge 10 of FIG. 1 includes an indicator 20 which can move horizontally to overlap one of three temperature regions: white/blank zone 30, green/yellow zone 40, and red zone 50. Before the vehicle starts/warms up, the indicator is expected to overlap with the white/blank zone 30. Once the vehicle has warmed up and reached its normal operating temperature 60, which often takes around seven minutes, the indicator 20 is expected to overlap with the green/yellow zone 40. When the vehicle has gotten too hot—i.e., reached or exceeded an overheat temperature 70—the indicator is expected to overlap the red zone 50.

However, conventional systems suffer from several drawbacks. For example, damage to the engine begins well before it has reached the "red zone" level of overheating. Also, the operator of the vehicle is often too distracted to notice right away that the gauge indicates temperatures are rising and approaching the red zone 50, and often by the time the operator notices there is overheating, the engine has already suffered costly or even irreparable damage. Moreover, if the engine is allowed to reach temperatures that are considered to be unacceptable according to the conventional temperature gauge 10, the vehicle will become more prone to overheating the next time; for example, the engine will overheat from (for example) a less significant blockage of the ventilation system once it has overheated in the past. What is needed is an early warning system for detecting more relevant increases in temperature and informing the operator of rising temperatures in a more timely and effective manner, before there is overheating and permanent damage.

SUMMARY OF THE INVENTION

The invention, which is defined by the claims set forth at the end of this document, is directed to pre-overheat systems that alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

An exemplary pre-overheat system for minimizing engine damage due to overheating includes a temperature sensor for taking temperature readings in a vehicle, and a warning system for alerting a vehicle operator regarding rising temperatures. The system engages the warning system to alert the vehicle operator if temperatures reach the pre-overheat temperature. The pre-overheat temperature is at least one degree higher than the steady-state temperature for the vehicle, the steady-state temperature being the temperature that is maintained (substantially constant) by a temperature control system of the vehicle while the vehicle is functioning normally and running in normal environmental conditions. The steady-state temperature can be determined (or at least estimated) based on what temperatures are sustained (i.e., are fairly constant) while the vehicle is being operated under normal conditions when the vehicle (and in particular its temperature controls) is known to be functioning properly. The pre-overheat temperature is about 5 degrees above the steady-state temperature for many applications.

The pre-overheat temperature is lower than a redzone overheat temperature for the particular vehicle. The redzone overheat temperature depends on the particular vehicle and is based on manufacturer/factory specifications, but for many vehicles is around 260 degrees Fahrenheit. When the redzone overheat temperature is reached, the vehicle has gotten too hot and is likely to sustain irreparable damage. The operator can reduce or prevent damage to the vehicle by taking corrective action (such as stopping and checking coolant level and whether coolant is leaking, clearing debris from clogged vents and screens that impede air flow, inspecting the radiator for damage, turning off the vehicle for a given time to allow for cooling, or otherwise evaluate why the vehicle's temperature has started rising above normal levels) before the vehicle is overheated. Further advantages and features of the invention will be apparent from the remainder of this document in conjunction with the associated drawings.

BRIEF DESCRIPTION OF THE DRAWINGS

FIG. 1 shows a conventional three-zone vehicle temperature gauge, with a "red zone" set by the manufacturer to indicate overheating.

FIG. 2 depicts various components of an exemplary system, with sensors and the operator providing inputs into a controller, and the controller sending commands to the warning system and the remediation system.

DETAILED DESCRIPTION OF PREFERRED VERSIONS OF THE INVENTION

Figure 3:
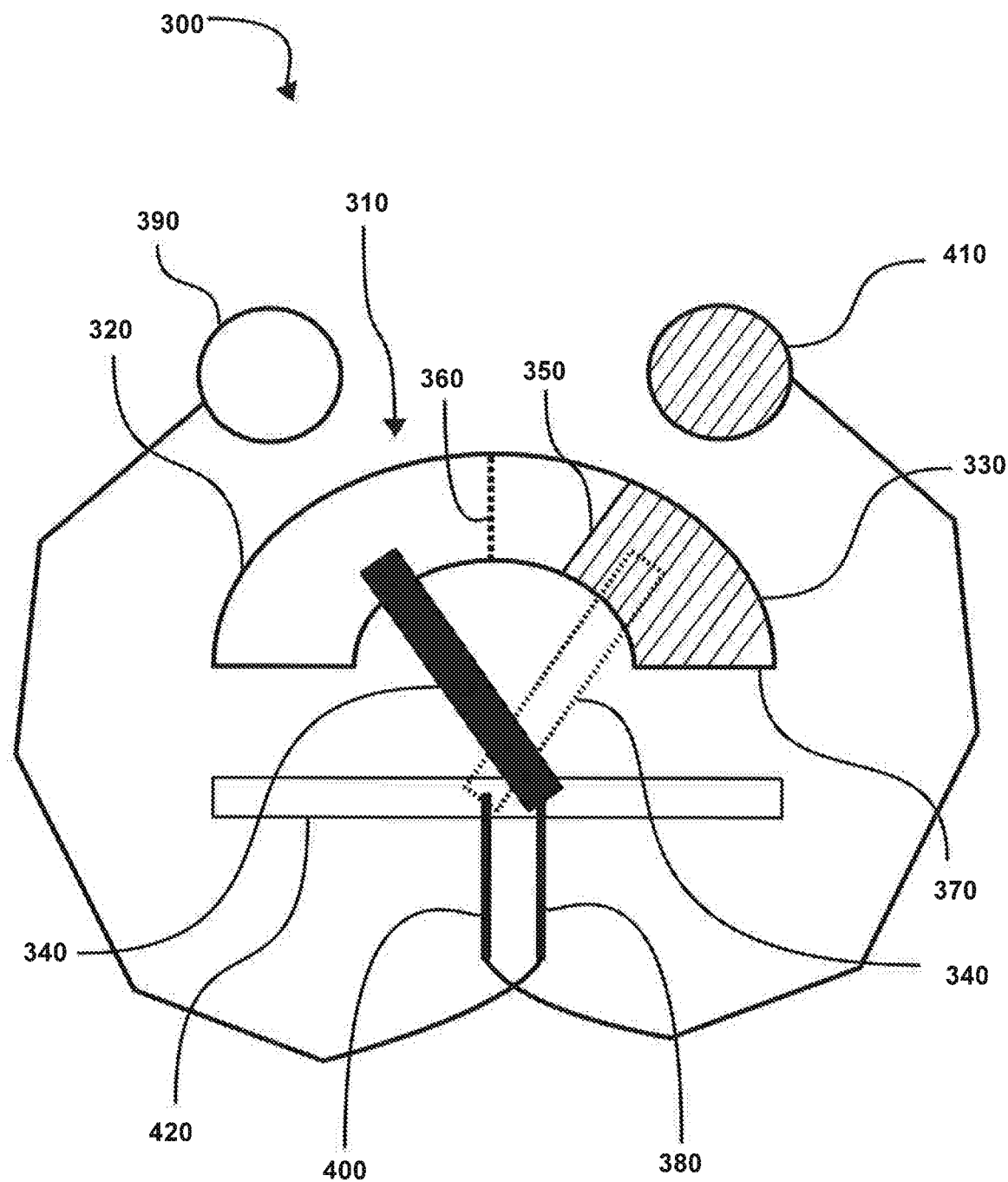
FIG. 3 depicts a representation of an exemplary version of the pre-overheat system in which a temperature gauge is wired so as to implement functions of the warning system.

The exemplary pre-overheat system 100 of FIG. 2 delegates overall control functions to a controller 110, which receives inputs from one or more sensors 130; this includes temperature readings from one or more temperature sensors, but can also optionally include any other readings related to vehicle function or environmental variables. Based on the temperature readings from sensors 130, the controller 110 activates the warning system 140 to alert the operator using one or more stimuli, such as flashing (or non-flashing) lights, noises (such as buzzing, beeping, voice prompts, etc.), and vibrations (of the seat, steering wheel, etc.). The system 100 may also include a remediation system 150 as a backstop in case the vehicle is deemed to be too hot for too long. The remediation system 150 can include any mechanisms that change the vehicle's state to effect a lowering of temperatures, such as: mechanical shut down mechanisms that shut off parts (such as a mower deck or one or more cylinders of the engine) or all of the vehicle off; and activation of additional cooling mechanism (such as additional fans). An operator input/output ("I/O") 160 allows the system 100 to provide information to the operator (e.g., via one or more digital readouts), such as temperature readings, malfunctions detected, actions taken, and imminent shutdowns. The operator I/O 160 also allows the system 100 to receive inputs and commands from the operator, such as an override of a shutdown (further discussed below), activation of available remedial measures, etc. The controller can be computerized, having hardware and software for receiving and processing inputs such as sensor readings, and for sending outputs such as commands to the warning system to engage components thereof. The controller is preferably part of the vehicle's built-in electronic control unit (ECU), but it can also be a separate electronic control and data processing unit that may include one or more application specific integrated circuits (ASICs) or other devices programmed to send warning signals when temperatures rise above the steady-state temperature.

In the exemplary version 300 depicted in FIG. 3 (which is not to scale), a dual-zone temperature gauge 310 includes a green zone 320 and a yellow zone 330 (which can be the "caution yellow" used on road signs). A third zone corresponding with a conventional "red zone" (see FIG. 1) may be eliminated because the pre-overheat system allows the operator to keep vehicle temperatures under control (i.e., below "red zone" temperatures). While temperatures are within an acceptable range, an indicator 340 overlaps with the green zone 320. Within the green zone 310 is the steady-state temperature 360, which is the steady/constant temperature at which the vehicle runs when the vehicle is operating normally (i.e., without any relevant components involved in temperature control failing, malfunctioning, or otherwise not operating as intended) and in normal environmental conditions. The constant steady-state temperature 360 varies, depending on the particular vehicle and its manufacturer specifications (i.e., as intended based on its original design and manufacture), and is regulated by the vehicle's cooling system.

Engine temperatures do not begin to rise (and remain) above the steady-state temperature 360 unless there is an issue to be resolved (e.g., something interfering with the vehicle's temperature control). A typical internal combustion engine's temperature will not rise more than 5 degrees above the steady-state running temperature unless there is a problem to be dealt with, such as debris buildup, coolant loss, or mechanical failure. It is thus expected that temperatures that rise to the pre-overheat temperature 350 (reaching the yellow zone 330) will continue to rise to redzone temperatures unless corrective action is taken. The number of degrees between the steady-state temperature 360 and the pre-overheat temperature 350 can vary depending on the application, but can be as little as one degree. Based on experience, in many applications, a suitable number of degrees above steady-state temperature is 5 degrees—i.e., a useful pre-overheat temperature is 5 degrees above the steady-state temperature for the vehicle.

For certain engines, small temperature fluctuations are more tolerable than for other engines, and the system may account for fluctuations that are normal or acceptable for particular engines before determining that the operator should be alerted. For example, if the temperature of a vehicle is expected to rise by as much as five degrees during normal operation, and during such a rise the temperature control for the vehicle brings the temperature back down to the steady-state temperature 360 in a short period of time, then a five-degree rise in temperatures does not necessarily indicate a pre-overheat condition for that vehicle. In this case, the pre-overheat temperature 350 could thus be set to be more than five degrees above the steady-state temperature 360.

The position of the indicator 340 within the zones 320, 330 (and changes in position) can be used to activate/engage elements of the warning system as part of a controller 420. In the illustrative schematic representation of FIG. 3, the indicator 340 makes contact with a green zone connector 380 to complete a circuit that activates a green light 390, indicating to the operator that temperatures do not indicate that the vehicle is heating abnormally. When the indicator 340 reaches the pre-overheat temperature 350 (and thus begins to enter the yellow zone 330), the indicator 340 makes contact with a yellow zone connector 400 to complete a circuit that activates a yellow light 410, indicating to the operator that temperatures are rising. Additional functions of the system can be implemented in similar fashion. Additional warning system components (such as a buzzer), remedial mechanisms (such as a shutdown), etc. can be activated or engaged based on the position of the indicator 340 in similar fashion using the controller 420. Warning signals could be sent using switches, relays, wireless connections (e.g., RF and/or optical), contact points, etc. that are activated or engaged when the temperature increases above an engine's steady-state running temperature.

Returning to the system 100 as represented in FIG. 2, the controller 110 (which can be implemented using both hardware and software) can receive temperature readings from the temperature sensor 130 constantly or intermittently, as long as temperature readings are received often enough to be able to observe rising temperatures in time to act. The temperature sensor 130 used can be the vehicle's standard temperature sensor (installed by the manufacturer of the vehicle as part of the vehicle's conventional components, such as a temperature sensor for the engine, its oil, or its coolant), or it can be an after-market temperature sensor (such as an additional, dedicated temperature sensor 130). The temperature sensor 130 can be any type of sensor (contact or non-contact) deemed suitable for the application, such as (for example) a rare earth optical temperature sensor. The temperature sensor 130 can be located in the vehicle wherever deemed suitable—such as within (or proximal to) the coolant, engine oil, exhaust, engine block, hood, etc.—as long as temperature changes can be reliably and timely assessed. The controller 110 includes a processor for comparing the temperature readings with the pre-overheat temperature, and engages the warning system 140 to alert a vehicle operator using one or more of (for example) a flashable light, a sound emitter, and a vibration mechanism that causes a seat and/or a steering wheel to vibrate.

The system 100 can further include a shutdown mechanism 150 for partially or completely shutting down the vehicle if certain conditions are met. The shutdown mechanism 150 could (for example) cut power to turn the vehicle off, deactivate one or more components (such as cylinders in the engine, if the vehicle has such a capability), or activate additional cooling mechanism (such as an additional fan). The shutdown mechanism 150 could be engaged if (for example) a shutdown temperature is reached, or if temperature readings remain at or above a given temperature (such as at or above twenty degrees over the steady state temperature, or at or above the redzone overheat temperature) for a shutdown time period. The shutdown temperature can be set to the pre-overheat temperature or higher. Lower shutdown temperatures might be preferable for a particular vehicle if, for example, the vehicle has become more prone to damage due to past overheating incidents. The shutdown temperature could be set to the redzone overheat temperature, or even to some temperature several degrees (e.g., such as five degrees) above. The shutdown time period can be adjusted based on (for example) how quickly temperatures tend to rise once there is a malfunction in temperature controls (such as a clogged vent), how prone a particular vehicle is to permanent damage from overheating, and/or based on how much time an operator is to be given to take corrective action before the vehicle is shut down. A shutdown time period may range (for example) from a few seconds to one or several minutes.

The operator I/O 160 preferably includes an operator interface for receiving an override command that deactivates or disengages the shutdown mechanism 150. This is particularly useful, for example, in an emergency, if the operator is stranded, or has no way to remedy the mechanical failure or coolant loss causing the temperature rise. The override command can be input into the system using conventional switches (such as a button, lever, etc.) or it could be entered using other input means, such as a touchscreen prompt, a voice command, etc. The override can be implemented via the controller, or via a direct connection 170. The operator i/O 160 can additionally require authentication or validation of the operator or his/her capacity or authority to override a shutdown procedure, such as by entry of a code, a biometric measurement, or other security measures.

The warning system 140 preferably can utilize flashing lights, sounds, and vibrations (along with any other alert mechanisms desired) as stimuli for alerting a vehicle operator that temperatures have risen and that remedial action should be taken. For example, multiple activation/intensity levels can be provided, such as a first alert level, a second alert level, and a third alert level. In each higher alert level (triggered by higher temperatures), the warning system could utilize a higher number of stimuli than in the prior lower alert level, and/or it could utilize a higher intensity for at least one of the stimuli used in the prior lower alert level. For example, reaching the pre-overheat temperature (e.g., three degrees above the steady-state temperature) can cause activation of a flashing yellow light (the first alert level). Rising a certain number of degrees above the pre-overheat temperature (e.g., five degrees) can cause an increase in the rate at which the light flashes and additionally activate a vibrating mechanism to vibrate the operator's seat (the second alert level). Reaching the redzone overheat temperature (e.g., 10 degrees above the pre-overheat temperature) can further result in vibration of the operator's steering wheel and activation of a loud buzzer to capture the operator's attention (the third alert level), or, if the operator's attention has already been captured, to impart a greater sense of urgency or communicate greater severity of the situation. An alert level may require that a rise in temperatures be sustained for a certain period before one alert is activated (such as a 10-degree rise without any significant drop in temperature for one minute). The alerts can continue until (for example) there is a shutdown of the vehicle, temperatures fall below the pre-overheat temperature, or an operator overrides one or more alerts.

The temperatures (and other data detected by sensors 130) can be processed/analyzed by a suitable electronic data processor, such as an application specific integrated circuit (ASIC), a microprocessor or programmable logic device (PLD), or other programmed or programmable device, including the vehicle's own built-in electronic control unit (ECU). Alternatively, analog processors might be used, such as providing the outputs of thermistors, thermocouples, silicon bandgap sensors, bimetal sensors, or other temperature sensors to comparators or other threshold detection devices to detect certain temperature thresholds, and/or to integrator circuits or other change detectors to detect unacceptable rates of temperature rise. Such a data processor can also supply suitable output signals to alert signal output devices of the warning system to indicate to an operator that an actual or potential engine problem exists. It is noted that the pre-overheat system can be used on any type of internal combustion engine, whether heavy-duty or light-duty, and whether installed in a vehicle or otherwise.

Various preferred versions of the invention are shown and described above to illustrate different possible features of the invention and the varying ways in which these features may be combined. Apart from combining the different features of the foregoing versions in varying ways, other modifications are also considered to be within the scope of the invention. For example, in FIG. 2, the controller 110 can have two-way communications with each of the components shown (i.e., not just with the operator i/O 160) to allow the controller 110 to better control the behavior of the components using feedback from the components. Also, the system 100 can include other direct connections (in addition to direct connect 170) where it would be useful, such as a direct connection between the sensors 130 and the remediation system 150 to allow for an immediate, automatic shutdown if temperatures have reached dangerous levels.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A pre-overheat system for preventing damage to an engine of a vehicle resulting from overheating, the system including:

a. a temperature sensor configured to provide a temperature reading in a running vehicle, the temperature reading being dependent on the vehicle engine temperature;

b. a warning alarm configured to provide a warning signal when the temperature reading exceeds a vehicle pre-overheat temperature, wherein the vehicle pre-overheat temperature is:
   (a) greater than a vehicle steady-state temperature, the vehicle steady-state temperature being the temperature reading arising while the vehicle is:
      i. functioning normally, and
      ii. running in normal environmental conditions, and
   (b) less than a vehicle redzone temperature, the vehicle redzone temperature being the temperature reading arising when the vehicle engine is experiencing damage from overheating.

2. The pre-overheat system of claim 1 wherein the vehicle pre-overheat temperature is at least 1° F. greater than the vehicle steady-state temperature.

3. The pre-overheat system of claim 1 wherein the vehicle pre-overheat temperature is at least 50° F. greater than the vehicle steady-state temperature.

4. The pre-overheat system of claim 1 wherein the vehicle redzone temperature is at least 50° F. greater than the vehicle steady-state temperature.

5. The pre-overheat system of claim 1 wherein the warning signal includes one or more of:
   a. a visible warning signal,
   b. an audible warning signal, and
   c. a tactile warning signal.

6. The pre-overheat system of claim 5 wherein:
   a. the warning alarm is further configured to provide the warning signal at:
      (1) a first alert level, and
      (2) a second alert level wherein the warning signal is provided at one or more of:
         (a) a greater intensity, and
         (b) a greater frequency,
         than at the first alert level;
   b. the warning alarm is engaged:
      (1) at the first alert level if the temperature reading exceeds the vehicle steady-state temperature, and
      (2) at the second alert level if the temperature reading is at or exceeds the vehicle pre-overheat temperature.

7. The pre-overheat system of claim 6 wherein the warning alarm is engaged at the first alert level if the temperature reading exceeds the vehicle steady-state temperature by at least 1° F.

8. The pre-overheat system of claim 6 wherein the warning alarm is engaged at the second alert level if the temperature reading exceeds the vehicle steady-state temperature by at least 5° F.

9. The pre-overheat system of claim 1 further including a shutdown mechanism configured to shut off a component of the vehicle if the temperature reading reaches a shutdown temperature, the shutdown temperature being:
   a. equal to or greater than the vehicle pre-overheat temperature, and
   b. less than the vehicle redzone temperature.

10. The pre-overheat system of claim 9 wherein the component of the vehicle shut off by the shutdown mechanism is a mower deck.

11. The pre-overheat system of claim 9 further including an operator interface configured to receive an override command from a vehicle operator, wherein the override command deactivates the shutdown mechanism.

12. The pre-overheat system of claim 1 wherein the warning alarm is configured to provide a tactile warning signal, the tactile warning signal including at least one of:
   a. vibration of a vehicle steering wheel, and
   b. vibration of a vehicle operator's seat.

13. The pre-overheat system of claim 1 further including a readout configured to provide a vehicle operator with the temperature reading.

14. A pre-overheat method for preventing damage to an engine of a vehicle resulting from overheating, the method including:
   a. obtaining a temperature sensor reading in a running vehicle, the temperature sensor reading being dependent on the vehicle engine temperature;
   b. providing a warning alarm if the temperature sensor reading exceeds a vehicle pre-overheat temperature, wherein the vehicle pre-overheat temperature is:
      (1) greater than a vehicle steady-state temperature, the vehicle steady-state temperature being the temperature sensor reading arising while the vehicle is:
         (a) functioning normally, and
         (b) running in normal environmental conditions, and
      (2) less than a vehicle redzone temperature, the vehicle redzone temperature being the temperature sensor reading arising when the vehicle engine is experiencing damage from overheating.

15. The pre-overheat method of claim 14 wherein the vehicle pre-overheat temperature is at least 5° F. greater than the vehicle steady-state temperature.

16. The pre-overheat method of claim 14 further including the steps of:
   a. providing the warning signal at a first alert level if the temperature reading exceeds the vehicle steady-state temperature, and
   b. providing the warning signal at a second alert level if the temperature reading is at or exceeds the vehicle pre-overheat temperature,
   wherein at the second alert level, the warning signal is provided at one or more of:
      (1) a greater intensity, and
      (2) a greater frequency,
      than at the first alert level.

17. A pre-overheat system for preventing damage to an engine of a vehicle resulting from overheating, the system including:
   a. a temperature sensor configured to provide a temperature reading in a running vehicle, the temperature reading being dependent on the vehicle engine temperature;
   b. a warning alarm emitting a warning signal when the temperature reading exceeds a vehicle pre-overheat temperature, wherein the vehicle pre-overheat temperature is:
      (1) at least 5° F. greater than a vehicle steady-state temperature, the vehicle steady-state temperature being the temperature reading arising while the vehicle is:
         (a) functioning normally, and
         (b) running in normal environmental conditions, and
      (2) less than a vehicle redzone temperature, the vehicle redzone temperature being at least 50° F. greater than the vehicle steady-state temperature.

18. The pre-overheat system of claim 17 wherein:
a. the warning alarm is further configured to provide a warning signal at:
   (1) a first alert level if the temperature reading exceeds the vehicle steady-state temperature, and
   (2) a second alert level if the temperature reading is at or exceeds the vehicle pre-overheat temperature,
   wherein at the second alert level the warning signal is provided at one or more of:
      (a) a greater intensity, and
      (b) a greater frequency,
      than at the first alert level.

19. The pre-overheat system of claim 17 further including a shutdown mechanism configured to shut off at least one component of the vehicle if the temperature reading reaches a shutdown temperature, the shutdown temperature being:
   a. equal to or greater than the vehicle pre-overheat temperature, and
   b. less than the vehicle redzone temperature.

20. The pre-overheat system of claim 19 further including an operator interface configured to receive an override command from a vehicle operator, wherein the override command deactivates the shutdown mechanism.

\* \* \* \* \*